US009308633B2

(12) United States Patent
Gharib

(10) Patent No.: US 9,308,633 B2
(45) **Date of Patent: *Apr. 12, 2016**

(54) ELECTRONIC TORQUE WRENCH WITH DUAL TENSION BEAM

(71) Applicant: Apex Brands, Inc., Sparks, MD (US)

(72) Inventor: Awad Aly Gharib, Cockeysville, MD (US)

(73) Assignee: Apex Brands, Inc., Sparks, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/499,946

(22) Filed: Sep. 29, 2014

(65) Prior Publication Data

US 2015/0013475 A1 Jan. 15, 2015

Related U.S. Application Data

(63) Continuation of application No. 12/754,028, filed on Apr. 5, 2010, now Pat. No. 8,844,381.

(60) Provisional application No. 61/166,545, filed on Apr. 3, 2009.

(51) Int. Cl.

| | |
|---|---|
| ***B25B 23/14*** | (2006.01) |
| ***G01D 1/00*** | (2006.01) |
| ***B25B 13/46*** | (2006.01) |
| ***B25B 23/144*** | (2006.01) |
| ***B25B 23/142*** | (2006.01) |

(52) U.S. Cl.
CPC .................................. *B25B 23/1425* (2013.01)

(58) Field of Classification Search
CPC B25B 23/1425; B25B 23/1427; B25B 23/14; B25B 13/463; B25B 21/005; B25B 13/04; B25B 17/02; B25B 21/002; B25B 13/08; B25B 13/14; B25B 21/00; B25B 23/0078; B25B 23/145; B25B 13/46
USPC ............................ 73/862.21, 862.31, 862.23
See application file for complete search history.

(56) References Cited

U.S. PATENT DOCUMENTS

| | | | |
|---|---|---|---|
| 2,303,411 | A | 12/1942 | Horn |
| 2,934,946 | A | 5/1960 | Engquist |
| 3,670,602 | A | 6/1972 | Van Hoose |
| 3,722,316 | A | 3/1973 | Hawkins et al. |
| 3,726,134 | A | 4/1973 | Grabovac |
| 3,911,736 | A | 10/1975 | Miller |
| 3,921,471 | A | 11/1975 | Smith |
| 4,257,263 | A | 3/1981 | Herrgen |

(Continued)

*Primary Examiner* — Lisa Caputo
*Assistant Examiner* — Brandi N Hopkins
(74) *Attorney, Agent, or Firm* — Nelson Mullins Riley & Scarborough, LLP

(57) ABSTRACT

A torque wrench comprises a handle, a wrench head having a ratcheting workpiece engaging portion, and a tensor beam defining a longitudinal axis and having a rectangular cross-section perpendicular to the longitudinal axis. A first strain gauge is coupled to one side of the tensor beam, and a second strain gauge is coupled to another side orthogonal to the one side. A processor coupled to the first and second strain gauges converts an output signal from one of the strain gauges into an equivalent torque value. The tensor beam is intermediate the handle and the wrench head and is rotatably coupled to the wrench head and is rotatable, with respect to the tensor beam, between a first position in which the processor processes an output signal from the first strain gauge and a second position in which the processor processes an output signal from the second strain gauge assembly.

20 Claims, 7 Drawing Sheets

(56) References Cited

U.S. PATENT DOCUMENTS

| | | | |
|---|---|---|---|
| 4,397,196 | A | 8/1983 | Lemelson |
| 4,558,601 | A | 12/1985 | Stasiek et al. |
| 4,561,332 | A | 12/1985 | Wood |
| 4,602,538 | A | 7/1986 | Neuhaus |
| 4,641,538 | A | 2/1987 | Heyraud |
| 4,643,030 | A | 2/1987 | Becker et al. |
| 4,805,464 | A | 2/1989 | Grabovac |
| 4,864,841 | A | 9/1989 | Heyraud |
| 4,958,541 | A | 9/1990 | Annis et al. |
| 4,982,612 | A | 1/1991 | Rittmann |
| 5,130,700 | A | 7/1992 | Annis et al. |
| 5,315,501 | A | 5/1994 | Whitehouse |
| 5,537,877 | A | 7/1996 | Hsu |
| 5,589,644 | A | 12/1996 | Becker et al. |
| 6,070,506 | A | 6/2000 | Becker |
| 6,076,439 | A | 6/2000 | Dzieman |
| 6,109,150 | A | 8/2000 | Saccomanno, III |
| 6,119,562 | A | 9/2000 | Jenkins |
| 6,155,147 | A | 12/2000 | Dzieman |
| 6,167,788 | B1 | 1/2001 | Schonberger et al. |
| 6,234,051 | B1 | 5/2001 | Bareggi |
| 6,276,243 | B1 | 8/2001 | Jenkins |
| 6,345,436 | B1 | 2/2002 | Codrington |
| D458,817 | S | 6/2002 | Jenkins |
| 6,463,811 | B1 | 10/2002 | Putney |
| 6,526,853 | B2 | 3/2003 | Jenkins |
| 6,698,298 | B2 | 3/2004 | Tsuji et al. |
| 6,968,759 | B2 | 11/2005 | Becker et al. |
| 6,981,436 | B2 | 1/2006 | Becker et al. |
| 7,000,508 | B2 | 2/2006 | Li et al. |
| 7,047,849 | B2 | 5/2006 | Lai |
| 7,069,827 | B1 | 7/2006 | Hsieh |
| 7,082,865 | B2 | 8/2006 | Reynertson, Jr. |
| 7,082,866 | B2 | 8/2006 | Becker |
| 7,089,834 | B2 | 8/2006 | Reynertson et al. |
| 7,107,884 | B2 | 9/2006 | Cutler et al. |
| 7,137,323 | B1 | 11/2006 | Hsieh |
| 7,168,349 | B1 | 1/2007 | Hsieh |
| 7,168,350 | B1 | 1/2007 | Hsieh |
| 7,174,817 | B1 | 2/2007 | Hsieh |
| 7,182,005 | B1 | 2/2007 | Hsieh |
| 7,185,571 | B1 | 3/2007 | Hsieh |
| 7,222,544 | B1 | 5/2007 | Jenkins |
| 7,370,539 | B2 | 5/2008 | Gharib et al. |
| 8,844,381 | B2 * | 9/2014 | Gharib ....................... 73/862.21 |
| 2002/0170395 | A1 | 11/2002 | Wang et al. |
| 2002/0178876 | A1 | 12/2002 | Wang et al. |
| 2004/0255733 | A1 | 12/2004 | Reynertson, Jr. |
| 2005/0061119 | A1 | 3/2005 | Becker |
| 2005/0072278 | A1 | 4/2005 | Cutler et al. |
| 2005/0092143 | A1 | 5/2005 | Lehnert et al. |
| 2005/0223856 | A1 | 10/2005 | Reynertson et al. |
| 2005/0263000 | A1 | 12/2005 | Hill |
| 2007/0119267 | A1 | 5/2007 | Anjanappa et al. |
| 2007/0119268 | A1 | 5/2007 | Escoe et al. |
| 2007/0119269 | A1 | 5/2007 | Anjanappa et al. |
| 2007/0144270 | A1 | 6/2007 | Crass et al. |
| 2008/0168871 | A1 | 7/2008 | Gharib et al. |

* cited by examiner

ELECTRONIC TORQUE WRENCH WITH DUAL TENSION BEAM

CLAIM OF PRIORITY

The present application is a continuation of U.S. patent application Ser. No. 12/754,028, filed Apr. 5, 2010, now U.S. Pat. No. 8,844,381, which claims priority to U.S. Provisional Patent Application Ser. No. 61/166,545, filed Apr. 3, 2009, entitled Electronic Torque Wrench with Dual Tension Beam, the entire disclosures of which are incorporated by reference herein.

FIELD OF THE INVENTION

The present invention relates generally to torque wrenches. More particularly, the present invention relates to electronic torque wrenches having a dual tensor beam that allows the wrench to operate over at least two operating ranges.

BACKGROUND OF THE INVENTION

Often, fasteners used to assemble performance critical components are tightened to a specified torque level to introduce a "pretension" in the fastener. For example, high tensile-strength steel bolts used to fasten components of military vehicles, aerospace vehicles, heavy machinery, and equipment for petrochemical operations frequently have required torque specifications. Torque is applied to the head of the fastener, which causes the fastener to stretch beyond a certain level of applied torque. This stretch results in pretension in the fastener which then holds the joint together. Overstressed bolts can lead to breakage whereas under-stressed bolts can lead to loosening of the fastener. Furthermore, an unequally stressed set of fasteners can result in gasket distortion and subsequent problems like leakage. Accurate and reliable torque wrenches help insure that fasteners are tightened to the proper torque specifications.

There are several types of torque wrenches that are routinely used to tighten fasteners to specified torque levels: mechanical and electronic torque wrenches. One of the more common mechanical-type torque wrenches, the clicker type mechanical torque wrench, makes an audible click to let the user know when a certain torque level has been achieved, and simultaneously provide a feeling of sudden torque release to the user. One example of a clicker torque wrench has a hollow tube in which a spring and pawl mechanism is housed. The pawl is forced against one end of a bar that is connected to a drive end. The bar and a drive head are pinned to the hollow tube and rotate as torque is applied. The pawl is released when the force applied by the bar increases beyond a preset torque level, the preset torque level being set by the spring acting on the pawl. When released, the bar hits the inside of the tube and produces a sound and a sudden torque release that is detectable by the user. Typically, the torque values are permanently marked on a drum type scale that is visible through a window near or on the handle, or marked on the tube itself.

Electronic torque wrenches utilize electronic circuitry for measuring and displaying torque values and typically have a keypad with multiple keys that are capable of a number of functions. A transducer sensor is mounted in the wrench handle and measures the shearing stress being applied to the transducer as the wrench is rotated. The transducer is electrically coupled back to a processor provided on or in the handle, which calculates the resulting torque based on the shearing stress being measured. One disadvantage of electronic torque wrenches is that they typically cover a narrow torque band that can be measured. Thus, multiple wrenches must be used to accurately cover a wide range of measurable torque.

The present invention recognizes and addresses the foregoing disadvantages, and others, of prior art constructions and methods.

SUMMARY OF THE INVENTION

The present invention provides a torque wrench for engaging a workpiece comprising a body, a wrench head, an elongated polygonal tensor beam and a processor. The body has a first end and an opposite second end. The wrench head has a first end defining a ratcheting workpiece engaging portion and a second end. The elongated polygonal tensor beam has a first end and a second end with an axis extending therebetween. A first strain gauge assembly is operatively coupled to a first side of the elongated tensor beam, and a second strain gauge assembly is operatively coupled to a second side of the elongated tensor beam, where the first side is orthogonal to the second side. The tensor beam first end is rotatably coupled to the wrench head second end, and the tensor beam second end is both rotatably and axially fixed to one end of the wrench body. A processor is operatively coupled to the first and the second strain gauge assemblies and converts an output signal from one of the first and the second strain gauge assemblies into an equivalent torque value. When the tensor beam is in a first position relative to the wrench head, the processor receives and processes an output signal from the first strain gauge assembly that corresponds to a torque applied to the tensor beam. When the tensor beam is in a second position relative to the wrench head, the processor receives and processes an output signal from the second strain gauge assembly that corresponds to a torque applied to the tensor beam.

In some embodiments, the elongated tensor beam has a first side and an opposite second side, and an orthogonal top and bottom surface with respect to the first and second sides. The first strain gauge assembly is operatively coupled to one of the tensor first and second sides, and the second strain gauge assembly is operatively coupled to one of said tensor top and bottom surfaces. In some embodiments, a width between the first and second sides is smaller than a width between the tensor top and bottom surfaces.

In other embodiments, the torque wrench further comprises a display, where the display may be of any suitable nature such as a liquid crystal display. In yet other embodiments, a bearing operatively couples the tensor beam first end to the wrench head. In still other embodiments, a detent releasably secures the wrench head in one of the first and second positions with respect to the tensor beam.

In some embodiments, the torque wrench, when in the first position, operates over a first predetermined torque range, and when in the second position operates over a second predetermined torque range. In yet other embodiments, the first predetermined torque range and the second predetermined torque wrench overlap.

In yet another embodiment, a torque wrench comprises a handle having a first end and an opposite second end, a wrench head having a first end defining a ratcheting workpiece engaging portion and a second end, an elongated tensor beam having a first end, a second end, an axis extending between the first and the second ends, where the elongated tensor beam has a rectangular cross-section taken perpendicular to the tensor beam axis. A first strain gauge assembly is operatively coupled to a first side of the rectangular tensor beam, and a second strain gauge assembly is operatively coupled to a second side of the rectangular tensor beam, where the first side is orthogonal to the second side. A processor is operatively coupled to the first and second strain gauge assemblies for converting an output signal from one of the first and second strain gauge assemblies into an equivalent torque value. The tensor beam first end is rotatably coupled to the wrench head second end, and the tensor beam second end is axially and rotatably secured to one end of the wrench handle. The wrench head is rotatable, with respect to the tensor beam, between a first position in which the processor processes an output signal from the first strain gauge assembly and a second position in which the processor processes an output signal from the second strain gauge assembly.

In alternate embodiments, a torque wrench for engaging a workpiece comprises a handle, a wrench head having a ratcheting workpiece engaging portion; and an elongated tensor beam defining a longitudinal axis and having a rectangular cross-section perpendicular to the longitudinal axis. The tensor beam has a first strain gauge coupled to one side of the tensor beam, and a second strain gauge coupled to another side of the tensor beam that is orthogonal to the one side. The tensor beam is intermediate the handle and the wrench head, and is rotatably coupled to the wrench head. A processor operatively coupled to the first and second strain gauges converts an output signal from one of the first and second strain gauges into an equivalent torque value. The wrench head is rotatable with respect to the tensor beam between a first position in which the processor processes an output signal from the first strain gauge and a second position in which the processor processes an output signal from the second strain gauge assembly.

Other objects, features and aspects of the present invention are provided by various combinations and sub-combinations of the disclosed elements, as well as methods of utilizing same, which are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Figure 1:
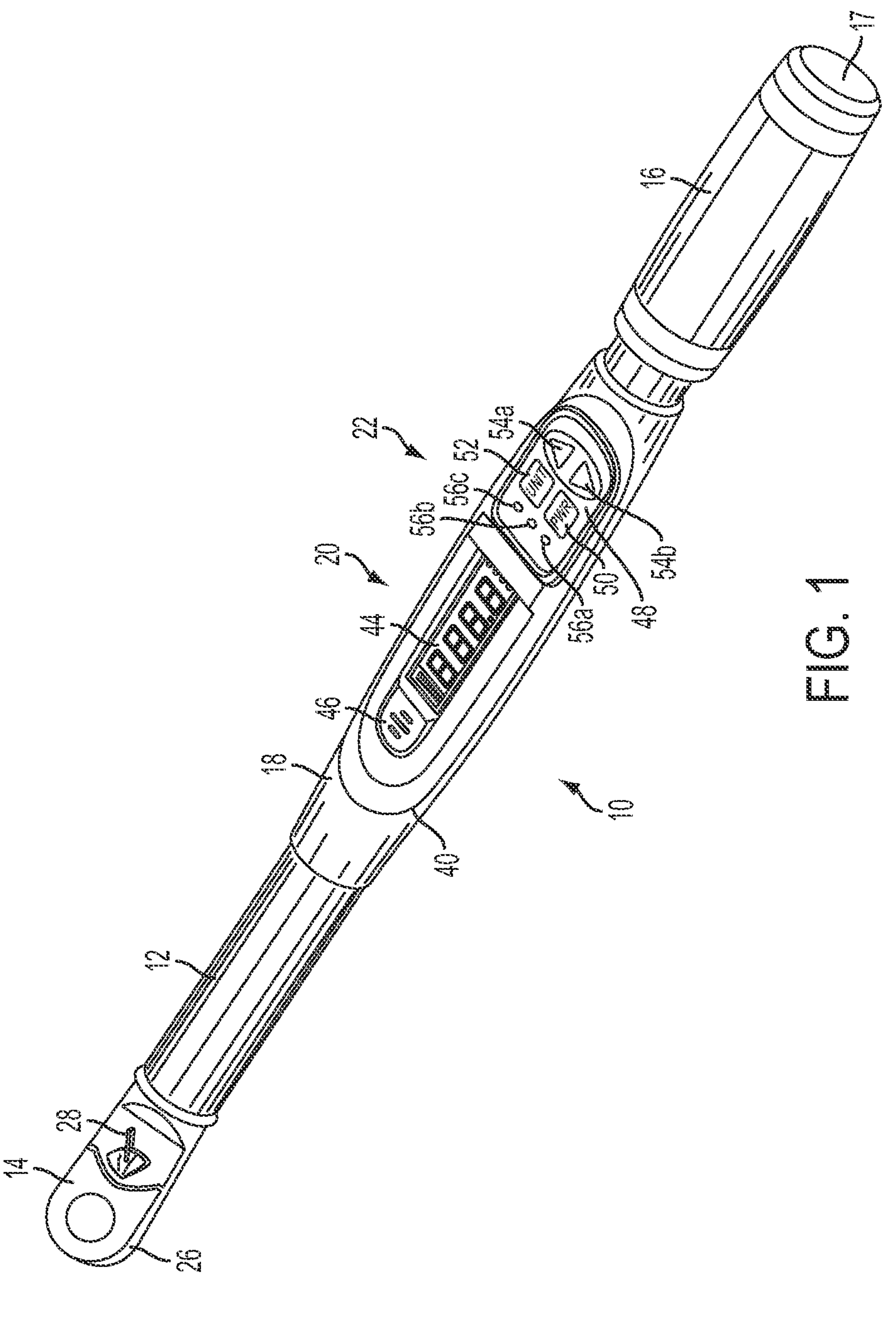
FIG. 1 is a perspective view of a preferred embodiment of an electronic torque wrench in accordance with the present invention.

Repeat use of reference characters in the present specification and drawings is intended to represent same or analogous features or elements of the invention according to the disclosure.

DETAILED DESCRIPTION OF THE PREFERRED EMBODIMENT

Reference will now be made in detail to presently preferred embodiments of the invention, one or more examples of which are illustrated in the accompanying drawings. Each example is provided by way of explanation, not limitation, of the invention. It is to be understood by one of ordinary skill in the art that the present discussion is a description of exemplary embodiments only, and is not intended as limiting the broader aspects of the present invention, which broader aspects are embodied in the exemplary constructions. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 2:
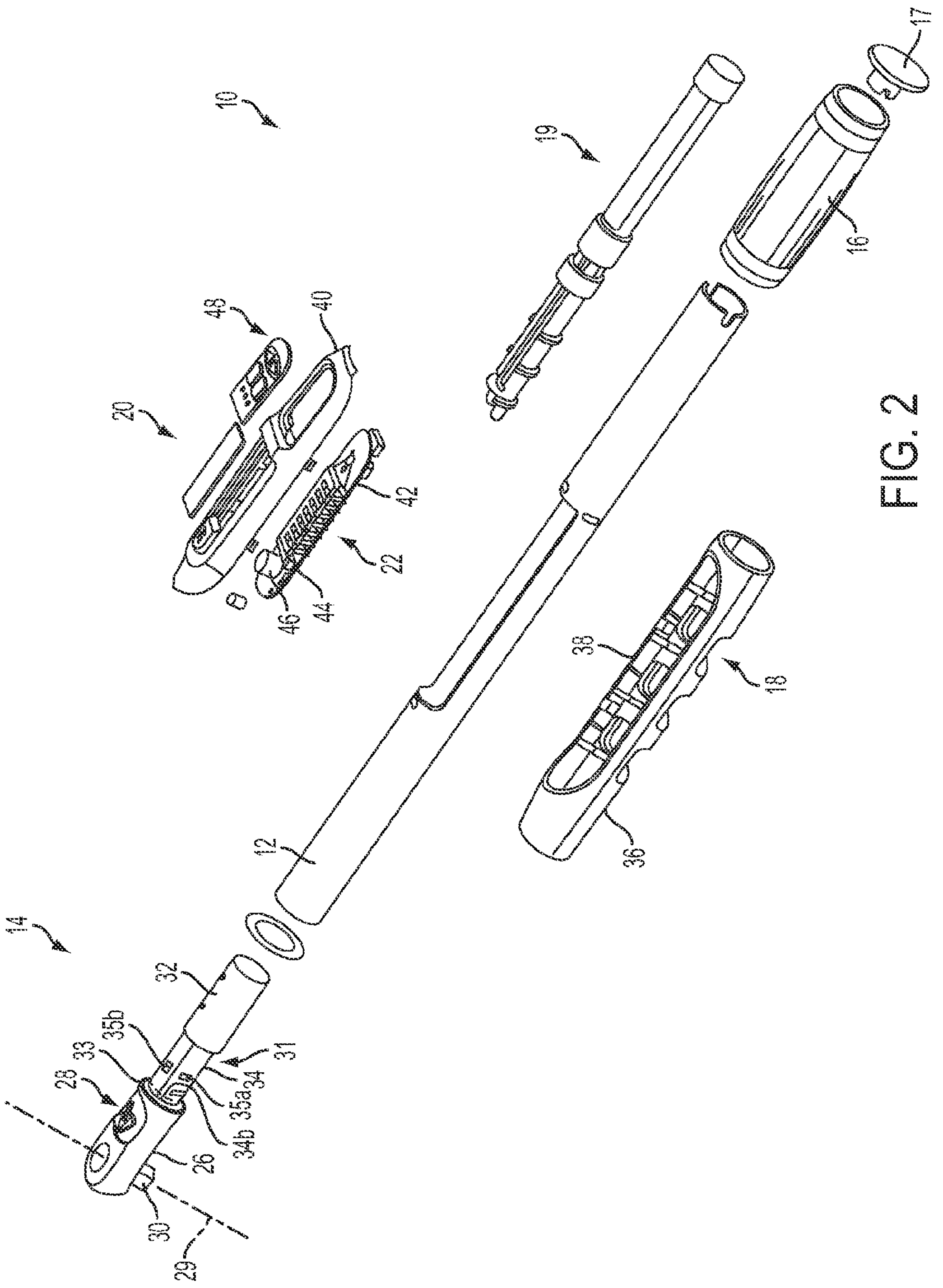
FIG. 2 is an exploded perspective view of the electronic torque wrench as shown in FIG. 1.

Referring to FIGS. 1 and 2, an electronic torque wrench 10 has a wrench body 12, a ratcheting wrench head 14, a grip handle 16, a housing 18, a battery assembly 19 (FIG. 2), and an electronics unit 20 with a user interface 22. Preferably, wrench body 12 is of tubular construction, made of steel or other rigid material. Wrench body 12 receives wrench head 14 at a first end and battery assembly 19 at a second end proximate handle 16. Battery 19 is secured in body 12 by an end cap 17 (FIG. 2). Housing 18 is mounted in a portion of body 12 and carries electronics unit 20.

A ratcheting mechanism 26 has a reversing lever 28 that allows a user to select whether torque is applied to a fastener in either a clockwise or counterclockwise direction. Ratcheting mechanism 26 includes a tang 30 (FIG. 2) for receiving variously sized sockets, extensions, etc. It should be understood that ratcheting mechanism 26 may include a ratchet ring that releasably accepts a socket within the ratchet ring as taught by U.S. Pat. No. 6,868,759, assigned to Easco Hand Tools, Inc., the entire disclosure of which is hereby incorporated by reference herein. A rear end 32 (FIG. 2) of wrench head 14 is slidably received in wrench body 12 and secured therein. In one preferred embodiment, wrench head rear end 32 is rotatable with respect to body 12 while being axially fixed to the body. In another preferred embodiment, wrench head rear end 32 is both rotationally and axially fixed to body 12.

Referring specifically to FIG. 2, wrench head 14 includes a tensor beam 31 having flat portions 34 formed between front and rear ends 26 and 32 for receiving at least two strain gauge assemblies 35*a* and 35*b*. In the preferred embodiment, strain gauge assemblies 35*a* and 35*b* are full-bridge assemblies including four separate strain gauges on a single film that is secured to respective orthogonal flat portions 34 of wrench head 14. An example of one such full-bridge strain gauge assembly is Model No. N2A-S1449-1KB manufactured by Vishay Micromeasurement. Together, the full-bridge strain gauge assemblies mounted on wrench head flat portions 34 are referred to as a strain tensor beam.

In one preferred embodiment, wrench head 26 has at least two flat portions 34 of varying thickness that allows the tensor beam to operate in two substantially independent operating ranges. It should be understood that wrench head 26 may have more than two flat portions 34 each having its own strain gauge assembly 35. Tensor beam 31 is configured to be rotatably connected to wrench head 26 so that the wrench head can be rotated with respect to the tensor beam. In this way, an axis 29 of tang 30 (FIG. 2) may be positioned perpendicular to a flat portion 34 of tensor beam 31. For example, when wrench head 26 is positioned perpendicular to flat portion 34 containing strain gauge assembly 35*b,* the wrench operates over a lower torque range than that when tang 30 is perpendicular to flat portion 34 containing strain gauge assembly 35*a.* This occurs because the thickness of tensor beam 31 is larger in one dimension as compared to the orthogonal dimension as discussed herein.

Figure 2A:
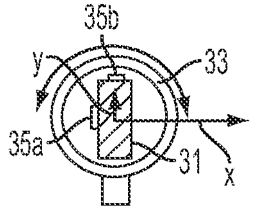
FIG. 2A is a cross sectional view of the tensor beam shown in FIG. 2.
Figure 2B:
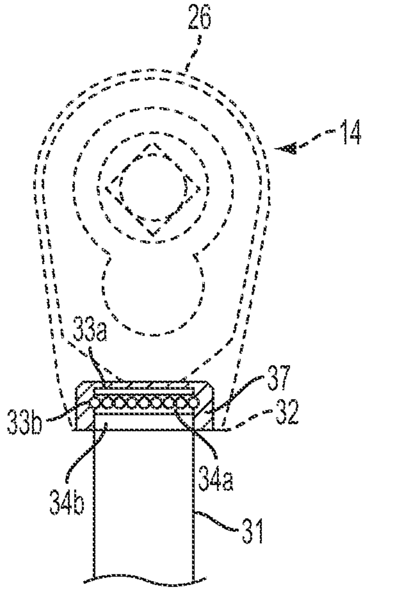
FIG. 2B is a partial cross-sectional view of the electronic torque wrench as shown in FIG. 1.

Referring to FIGS. 2A and 2B, tensor beam 31 is wider in the vertical y-plane as compared to the horizontal x-plane. This allows greater torquing when torque is applied in the vertical plane as compared to the horizontal plane. Said another way, the tensor beam will flex more when torque is applied in the horizontal x-plane as compared to when torque is applied in the vertical y-plane. In order to allow tensor beam 31 to be positioned in one of the two modes of operation, an end 33 of tensor beam 31 is rotatably connected to wrench head 26 by a bushing, bearing or by other suitable connections that allow the wrench head to be rotated with respect to tensor beam 31. Referring to FIG. 2B, in one embodiment, a blind bore 33*a* is formed in head rear end 32. A concave recess 33*b* is defined in the wall defining blind bore 33*a.* A corresponding concave recess 34*a* is formed in an outer circumference of a cylindrical portion 34*b* of tensor beam 34. Thus, when tensor beam portion 34*a* is inserted into blind bore 33*a,* recess 34*a* aligns with recess 33*b* forming a channel that receives a plurality of bearings 37. Consequently, head 14 rotates with respect to tensor beam 31.

In some embodiments, the rotatable connection includes a detent (not shown) to allow the wrench head to be locked into one of the various rotational positions. The detent may include a recess formed in an inner circumferential wall of an opening 33*a.* A movable pawl may be mounted to tensor beam cylindrical portion 34*b* proximate end 33 so that the pawl engages the recess as wrench head 26 is rotated. In other embodiments, the detent may engage a through hole formed in ratchet head 14 to allow a detent to extend into the through hole to provide a positive lock thereby preventing unintended rotation of the wrench head with respect to the tensor beam. In any event, wrench head 26 is connected to tensor beam 34 in a manner that allows the head to rotate about an axis of the tensor beam and handle for operating on different portions of tensor 31.

Figure 2C:
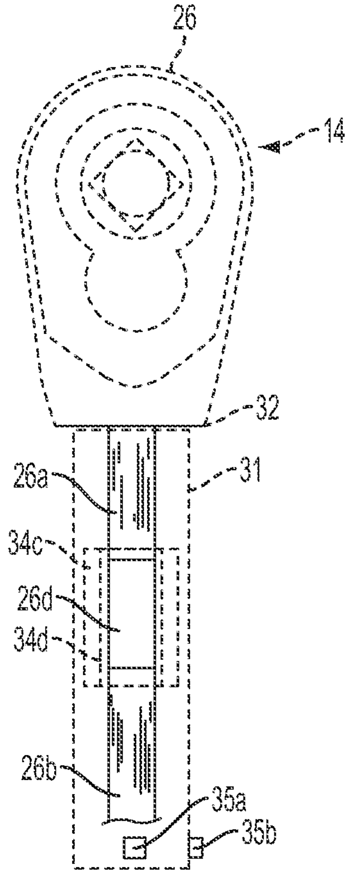
FIG. 2C is a top plan view of one embodiment of the present invention.
Figure 2D:
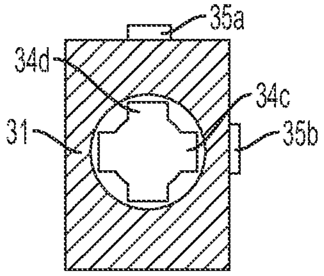
FIG. 2D is a cross-sectional view of the torque wrench handle of FIG. 2C.
Figure 2E:
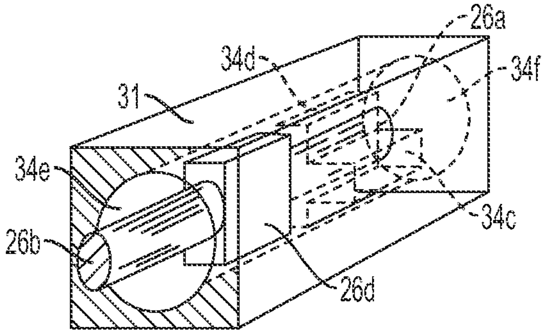
FIG. 2E is a partial perspective cross-section view of the torque wrench of FIG. 2C.

In an other embodiment shown in FIGS. 2C-2E, wrench head 26 may be releasably coupled to tensor beam 34 in such a way that the head is rotatable with respect to the tensor beam between a first position (FIG. 2C) in which strain gauge assembly 35*b* is operable and a second position in which strain gauge 35*a* is operable. In particular, head 26 is integrally formed with an elongated body comprised of a first cylindrical portion 26*a,* a second cylindrical portion 26*b* and a third rectangular portion 26*d* formed intermediate the first and second cylindrical portions, as shown in FIGS. 2C and 2E.

Referring to FIGS. 2D and 2E, tensor beam 31 defines an axial bore formed in tensor beam end 33. Specifically, the axial bore comprises a first cylindrical portion 34*e,* a second cylindrical portion 34*f* and a third polygonal section formed by two orthogonal rectangular sections 34*c* and 34*d.* In this configuration, the head elongated body may be moved axially with respect to tensor beam 31 so that rectangular portion 26*d* moves out of one of rectangular recess sections 34*c* and 34*d.*

Once the rectangular head body portion 26*d* clears the polygonal recess portion, head 26 may be rotated 90 degrees. At this point, the head elongated body may be moved axially with respect to tensor beam 31 so that rectangular portion 26*d* moves back into the other one of rectangular recess sections 34*c* and 34*d.*

This above described configuration allows head 26 to rotate with respect to tensor beam 31, while allowing it to be rotationally fixed to the tensor beam when being used. Additionally, rotational stops (not shown) may be formed with the tensor beam axial bore to prevent the head from rotating more than 90 degrees in the clockwise and counterclockwise direction. In addition, a spring (not show) may be located intermediate the head elongated body and the tensor beam axial bore to bias the head elongated body into one of the two rotationally fixed positions. Finally, a detent may be positioned intermediate the head elongated body and the tensor beam to axially fix the head elongated body in one of the two positions to prevent inadvertent disengagement and rotation of the head with respect to the tensor beam.

Referring to FIG. 2, housing 18 includes a bottom portion 36 that is slidably received about wrench body 12, and that defines an aperture 38 for receiving a top portion 40 that carries electronics unit 20. Electronics unit 20 provides a user interface for the operation of the electronic torque wrench. Electronics unit 20 includes a printed circuit board 42 including a digital display 44 and an annunciator 46 mounted thereon. A user input device 48, received in an aperture defined by top portion 40 of the housing, includes a power button 50 (FIG. 1), a unit selection button 52 (FIG. 1), increment/decrement buttons 54*a* and 54*b* (FIG. 1), and three light emitting diodes (LEDs) 56*a,* 56*b* and 56*c* (FIG. 1). Light emitting diodes 56*a,* 56*b* and 56*c* are green, yellow and red, respectively, when activated.

Figure 3:
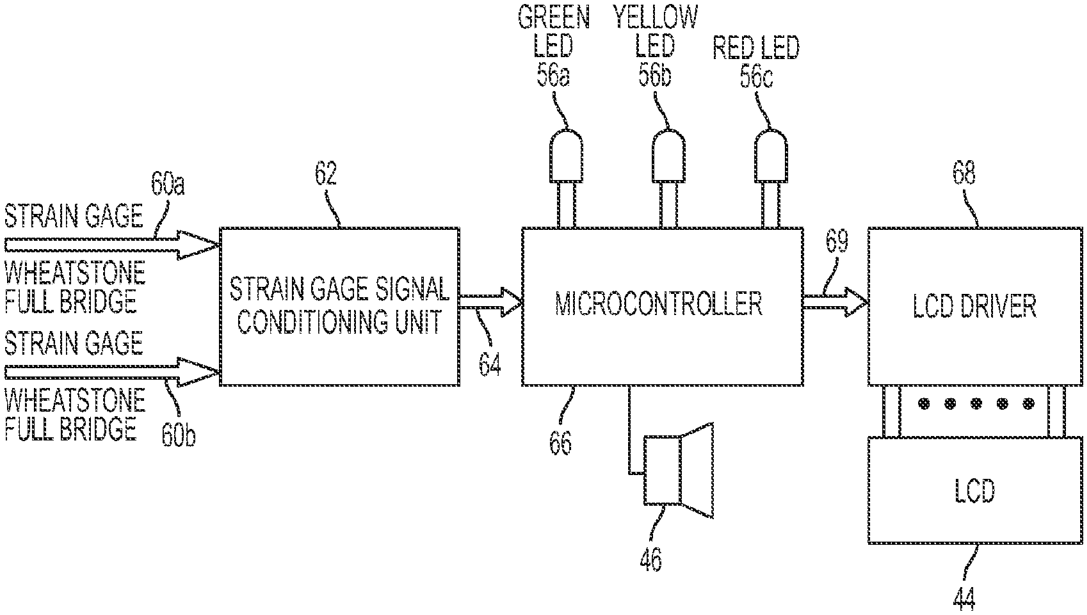
FIG. 3 is a block diagram representation of the electronics of the electronic torque wrench as shown in FIG. 1.

Referring specifically to FIG. 3, illustrated is a block diagram representation of the electronics of the preferred embodiment, showing various inputs and outputs. When electronic torque wrench 10 is used to apply and measure torque, one of two strain gauges 60*a* and 60*b*, depending on the orientation of head 26 with respect to handle 12, senses the torque applied to the fastener and sends a proportional electrical signal 60 to a strain gauge signal conditioning unit 62 that amplifies the signal, adjusts for any offset of the signal, and compensates the signal for temperature, as discussed later. Adjusting for the offset of the signal increases the accuracy of the wrench by compensating the signal for any reading that may be present before torque is actually applied to the fastener. An amplified and conditioned electrical signal 64 is fed to a microcontroller 66 (for example, Model No. ADuC843 manufactured by Analog Devices, Inc.) that converts the electrical signal into an equivalent torque value in the desired units.

Figure 4A:
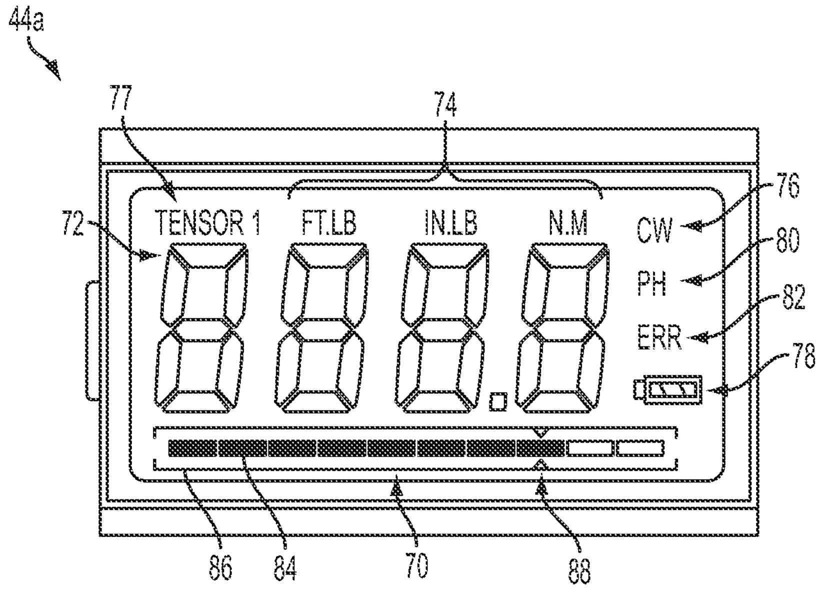
FIGS. 4A and 4B are views of display devices as used with the electronic torque wrench shown in FIG. 1.
Figure 4B:
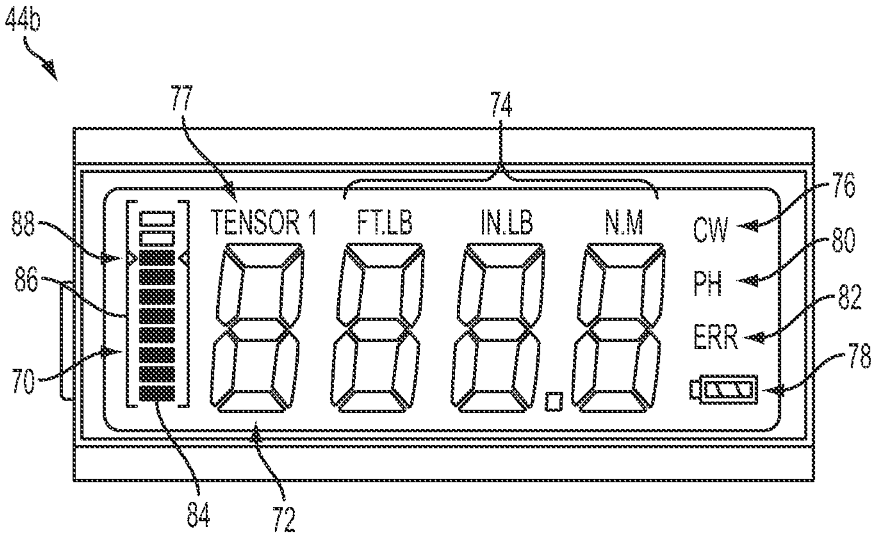

Microcontroller 66 sends an electrical signal 69, including the current torque level value and the peak torque value, to digital display 44 via a LCD driver circuit 68 (Model No. HT1621 manufactured by Holtek Semiconductors, Inc.). Digital display 44 displays the current torque level value as a bar graph and simultaneously displays the peak torque value as a numeric value, as seen in FIGS. 4A and 4B. Furthermore, microcontroller 66 generates alarm signals in the form of audio signals and light displays of appropriate color once the current torque level value is within a pre-selected range. A red color backlight coincides with the alarm signals to indicate to the user that the preset torque value has been reached. When the red backlight is activated, either flashing or continuous, the user is alerted as to the possibility of over-torquing the fastener.

In some embodiments, microcontroller 66 may be programmed to detect the orientation of head 14 with respect to tensor beam 31 (FIG. 2). That is, microcontroller 66 can be preprogrammed to operate over predetermined ranges depending on whether strain gauge 35*a* or 35*b* is positioned for operation. Detection of the orientation of head 14 may be carried out by sensors, contact tabs or by any other suitable means that allows the microcontroller to detect the strain gauge assembly being used. In other embodiments, microcontroller 66 may be configured to work with either strain gauge assembly without knowledge of which is providing the signal. That is, the microcontroller is calibrated over a range that encompasses the combined output of each respective strain gauge assembly. Additionally, a switching mechanism can be operatively placed intermediate the strain gauge assembly outputs and the microcontroller so that the switch only allows one output to be connected to the microcontroller based on the orientation of head 14 with respect to tensor beam 31. In such a configuration, knowledge of the orientation of the ratchet head with respect to the tensor beam is not necessary for the microcontroller to calculate the measured torque.

Referring to FIGS. 4A and 4B, the LCD units include a current torque level indicator 70, a four digit numeric display 72, an indication of units selected 74 (foot-pound, inch-pound, and Newton-meter), a torque direction indicator 76 (clockwise (CW) by default and counterclockwise (CCW) if selected), a battery level indicator 78, a peak hold (PH) indicator 80 and an error (Err) indicator 82. As shown, current torque level indicator 70 is in the form of a bar graph. The bar graph is shown in two embodiments, horizontal 44*a* (FIG. 4A) and vertical 44*b* (FIG. 4B). In either case, preferably, the bar graph includes a total of ten segments 84 and a frame 86 that encompasses all ten segments 84. Frame 86 is filled by the ten segments when the preset torque value input by the user is reached. At other times, frame 86 is only partially filled with segments 84, and therefore gives a graphical display of approximately how much torque is currently being applied and how much more torque needs to be applied to the fastener to reach the preset torque valve.

As shown, two small arrows 88 are located on opposing sides of the eighth segment. Arrows 88 are graphical indicators to the user that the current torque level is above 75% of the preset torque value. Each segment 84 within frame 86 represents 10% of the preset torque value, starting from the left or bottom of each bar graph, respectively. Simultaneously, digital display 44 also displays the peak torque value applied up until that time in numeric display 22. As such, if torque has been applied in a continuously increasing manner, the peak torque value displayed will actually be the same as the current torque value. The decimal point will be displayed depending on which units the user has selected.

It should be understood that any display configuration is contemplated under the present invention. For example in some embodiments, only the instantaneous torque may be displayed in numerical form. In other embodiments, the instantaneous torque and the peak torque may be displayed in numerical form. In alternate embodiments, the user may program in a predetermined torque value. Then during operation, the torque wrench may provide an audible and/or visual signal to alert the user that the predetermined torque level has been reached. In this way, the user does not have to focus on the display when trying to apply torque to the workpiece. The display and microcontroller may also be programmed to detect and indicate the orientation of the ratchet head with respect to the tensor beam. In particular, an indicator 77 (FIGS. 4A and 4B) may display whether the first or second tensor portion is positioned for operation. In some embodiments, indicator 77 may display the applicable torque range.

Figure 5:
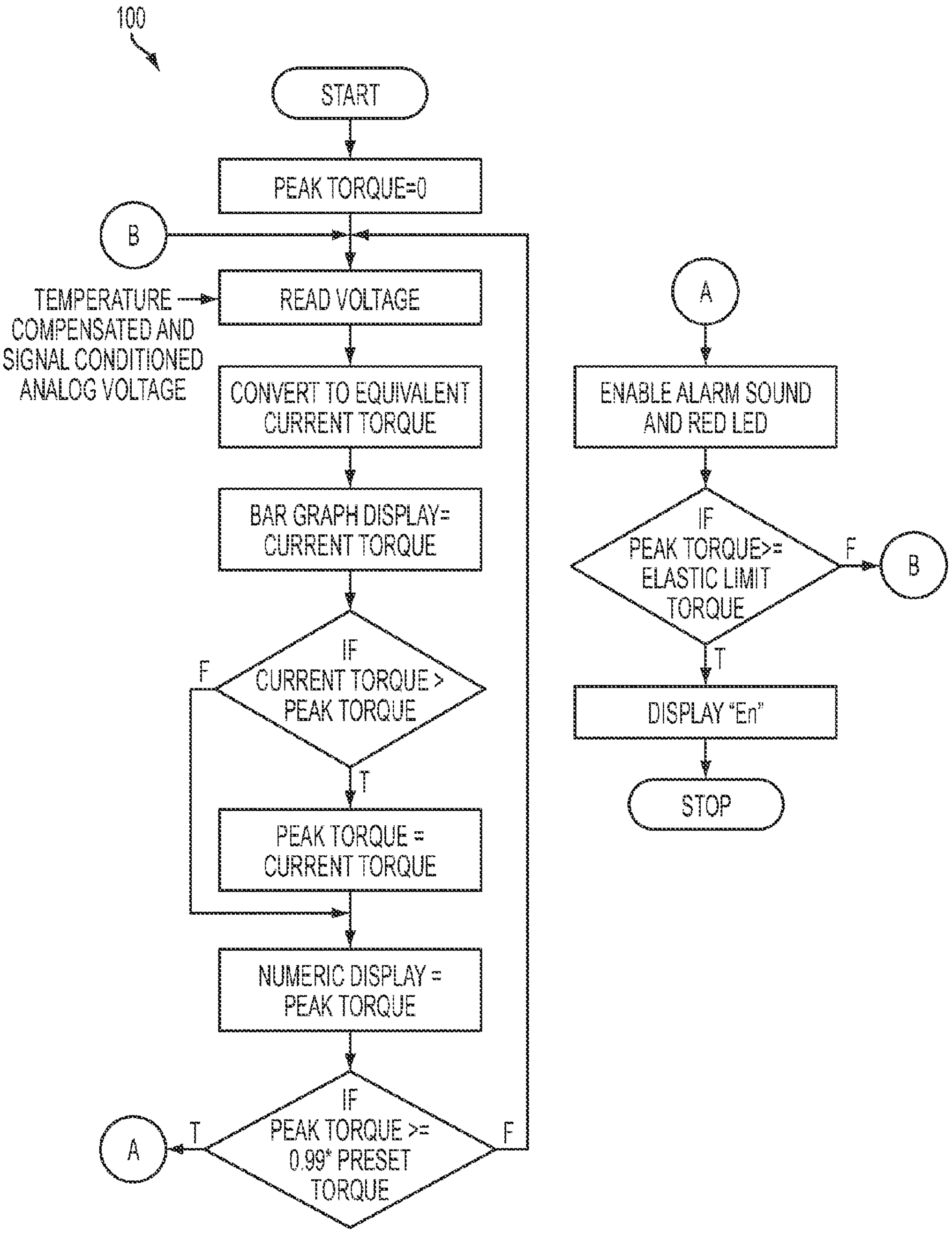
FIG. 5 is a flow chart of the simultaneous display algorithm of the display devices as shown in FIGS. 4A and 4B.

Referring now to FIG. 5, a flow chart 100 of the algorithm used with the electronics unit is shown. Prior to initiating torquing operations, a user inputs a preset torque value into the electronic torque wrench that equals the maximum desired torque to be applied to the fastener. This value is displayed in numeric display 72 (FIGS. 4A and 4B) until the user actually applies torque to the fastener, at which time the numeric display switches to displaying the peak torque value. The user must also ensure that wrench head 14 is positioned with respect to tensor beam 31 so that the wrench operates over the proper torque range.

As torque is applied, microcontroller 66 (FIG. 3) receives and reads a temperature compensated conditioned analog voltage signal 64 (as previously discussed with regard to FIG. 3) from strain gauge signal conditioning circuit 62, converts the analog signal to an equivalent digital number, converts the digital number to an equivalent current torque value corresponding to the user selected units, and determines whether the current torque value is a new peak torque value. This is accomplished by comparing the current torque value to the existing peak torque value, and either replacing the peak torque value if it is exceeded (T), or rechecking the measured torque if it is less than the recorded peak (F). Once both the current torque value and peak torque value are determined, microcontroller 66 sends electrical signal commands 69 to LCD driver circuit 68 to generate appropriate signals to the digital display unit for updating segments 84 shown in current torque level indicator 70 (the bar graph) and the peak torque value shown in numeric display 72.

In addition, microcontroller 66 (FIG. 3) switches green 56*a*, yellow 56*b*, and red 56*c* LEDs on or off depending on the peak torque value applied to the fastener up until that time. Preferably, green LED 56*a* comes on as long as the peak torque value is below 75% of the preset torque value and is switched off once the peak torque reaches 75% of the preset torque value. Yellow LED 56*b* comes on for peak torque values greater than 75% but less than 99% of the preset torque value. Red LED 56*c* comes on once the peak torque value reaches 99% of the preset torque value and stays on thereafter. The selection of percentage ranges for each color may be programmed, and the percentages at which the LEDs are switched on or off can be changed to suit the specific application. Embodiments are envisioned that include a liquid crystal display device that is capable of displaying multiple colors, which permits the warning LEDs to be replaced by appropriately colored symbols on the LCD. Furthermore, other portions of the display may be presented in color, for example the segments of the bar graphs and graphical displays, to enhance the warning capabilities for the user.

Once the peak torque reaches the preset torque value, or is within a user selected range, microcontroller 66 (FIG. 3) may generate electrical signals to cause an alarm to sound on annunciator 46. A red color backlight (not shown) may coincide with the audible alarm signal, indicating that the preset torque value has been reached. More colors, such as yellow and green, can be added as backlights to further assist the user when approaching the preset torque value. The user is also alerted if the mechanically safe torque value (elastic limit of the strain tensor) has been exceeded, possibly causing the torque wrench to lose proper calibration. This is determined by comparing the peak torque value to the elastic limit torque of the torque wrench. If the safe torque value is exceeded (T), an "Err" message is displayed on error indicator 82 and the unit stops, thus indicating that the electronic torque wrench unit needs calibration before it can be used again.

Figure 6:
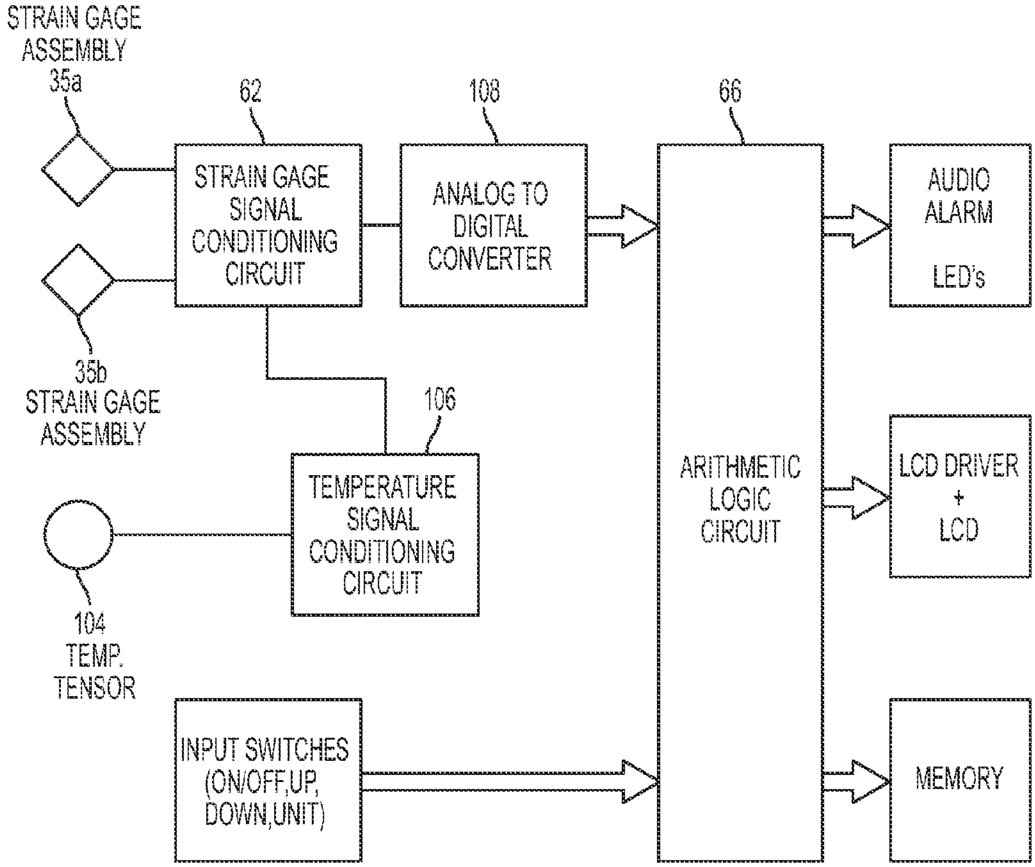
FIG. 6 is a block diagram including the temperature compensation circuit of the display devices as shown in FIGS. 4A and 4B.

FIG. 6 illustrates a block diagram of temperature compensation circuit 100. As noted, strain gauge assemblies 35*a* and 35*b* are full bridge assemblies with four strain gauges whose resistance changes as load is applied to a fastener. Full bridge strain gauge assemblies 35*a* and 35*b* are electrically connected to strain gauge signal conditioning circuit 62, which provides excitation to full bridge strain gauge assemblies 35*a* and 35*b* and accepts the low level voltage output of the strain gauge assembly. As previously discussed, the low level signal from the strain gauge assemblies is amplified and compensated for offset. A temperature sensor 104 senses the existing ambient temperature, and a temperature signal conditioning circuit 106 amplifies, quantizes, and then outputs a temperature signal to strain gauge signal conditioning circuit 62, which compensates the strain gauge signal to account for the effect of temperature changes.

Without a temperature compensation provision, the strain gauge signal would be converted to an equivalent torque value based on a fixed temperature. As noted, strain gauge output can be affected by fluctuations in temperature. Using temperature compensation methods disclosed herein, temperature calibration is carried out at different temperatures in which the electronic torque wrench may be used, for example, temperatures ranging from negative 20 degrees to positive 65 degrees Celsius. When the effect of temperature on the strain gauges is approximated as linear over the range of temperatures, it is sufficient to calibrate at only two temperatures to determine the needed compensation. Although linear compensation is used in the preferred embodiment, temperature signal conditioning circuit 106 may also accommodate nonlinear temperature compensation for a nonlinear relationship between temperature and its effect on the strain gauge outputs. For those embodiments, strain gauge signal conditioning circuit 62 includes a digital memory where a lookup table of nonlinear calibration data is stored. If nonlinear calibration is chosen, the electronic torque wrench is calibrated over its expected operating temperature range and constants are determined for each temperature increment. This data is then stored in the digital memory space available on the signal conditioning circuit, thus allowing for nonlinear temperature calibration. The nonlinear compensation can also be accomplished using a polynomial curve with a finite number of constants rather than using a look up table. The output of strain gauge signal conditioning circuit 62 is therefore a temperature compensated and conditioned analog voltage that is fed to an analog to digital converter of microcontroller 66.

While one or more preferred embodiments of the invention have been described above, it should be understood that any and all equivalent realizations of the present invention are included within the scope and spirit thereof. The embodiments depicted are presented by way of example and are not intended as limitations upon the present invention. Thus, those of ordinary skill in this art should understand that the present invention is not limited to these embodiments since modifications can be made. Therefore, it is contemplated that any and all such embodiments are included in the present invention as may fall within the scope and spirit thereof.

What is claimed:

1. A torque wrench for engaging a workpiece, comprising:

a. a body having a first end and an opposite second end;

b. a wrench head having i. a first end defining a workpiece engaging portion, and ii. a second end, b. an elongated tensor beam having i. a first end, ii. a second end, iii. an axis extending between the first and the second ends, iv. a first strain gauge assembly operatively coupled to a first side of the elongated tensor beam, and v. a second strain gauge assembly operatively coupled to a second side of the elongated tensor beam, wherein the tensor beam first end is rotatably coupled to the wrench head second end so that the wrench head is rotatable with respect to the tensor beam, and wherein the tensor beam second end is axially and rotatably secured to one end of the wrench body, c. a processor operatively coupled to the first and the second strain gauge assemblies for converting an output signal from one of the first and the second strain gauge assemblies into an equivalent torque value, wherein when the tensor beam is in a first position relative to the wrench head, the processor receives and processes an output signal from the first strain gauge assembly corresponding to a torque applied to the tensor beam, and when the tensor beam is in a second position relative to the wrench head, the processor receives and processes an output signal from the second strain gauge assembly corresponding to a torque applied to the tensor beam.

2. The torque wrench of claim 1, wherein the first side of the tensor beam is orthogonal to the second side of the tensor beam.

3. The torque wrench of claim 1, wherein the wrench head further comprises a ratcheting mechanism.

4. The torque wrench of claim 1, wherein the tensor beam has a first width in a first direction perpendicular to both its first side and its axis and a second width in a second direction perpendicular to both its second side and its axis, wherein the first width is smaller than the second width.

5. The torque wrench of claim 1, the torque wrench further comprising a display.

6. The torque wrench of claim 5, wherein the display is a liquid crystal display.

7. The torque wrench of claim 1, wherein a bearing operatively couples the tensor beam first end to the wrench head.

8. The torque wrench of claim 1, further comprising a detent for releasably securing the wrench head in one of the first and the second positions with respect to the tensor beam.

9. The torque wrench of claim 1, wherein when the torque wrench is in the first position, the torque wrench operates over a first predetermined torque range, and when the torque wrench is in the second position, the torque wrench operates over a second predetermined torque range.

10. The torque wrench of claim 9, wherein the first predetermined torque range and the second predetermined torque wrench overlap.

11. A torque wrench for engaging a workpiece, comprising:

a. a handle having a first end and an opposite second end;

b. a wrench head having i. a first end defining a workpiece engaging portion, and ii. a second end, c. an elongated tensor beam having i. a first end, and ii. a second end, iii. a first strain gauge assembly operatively coupled to a first side of the tensor beam, and iv. a second strain gauge assembly operatively coupled to a second side of the tensor beam, v. a processor operatively coupled to the first and the second strain gauge assemblies for converting an output signal from one of the first and the second strain gauge assemblies into an equivalent torque value, wherein the tensor beam first end is rotatably coupled to the wrench head second end so that the wrench head is rotatable with respect to the tensor beam, and the tensor beam second end is axially and rotatably secured to one end of the wrench handle, the wrench head is rotatable, with respect to the tensor beam, between a first position in which the processor processes an output signal from the first strain gauge assembly and a second position in which the processor processes an output signal from the second strain gauge assembly.

12. The torque wrench of claim 11, wherein the first side of the tensor beam is orthogonal to the second side of the tensor beam.

13. The torque wrench of claim 11, wherein when the torque wrench is in the first position, the torque wrench operates over a first predetermined torque range, and when the torque wrench is in the second position, the torque wrench operates over a second predetermined torque range.

14. The torque wrench of claim 13, wherein the first predetermined torque range and the second predetermined torque wrench overlap.

15. The torque wrench of claim 11, the torque wrench further comprising a display.

16. The torque wrench of claim 11, wherein the wrench head further comprises a ratcheting mechanism.

17. A torque wrench for engaging a workpiece, comprising:

a. a handle;

b. a wrench head having a workpiece engaging portion; and c. an elongated tensor beam defining a longitudinal axis and having i. a first strain gauge coupled to a first flat portion of the tensor beam, and ii. a second strain gauge coupled to a second flat portion of the tensor beam, wherein the tensor beam is intermediate the handle and the wrench head, and the tensor beam is rotatably coupled to the wrench head so that the wrench head is rotatable with respect to the tensor beam, d. a processor operatively coupled to the first and the second strain gauges for converting an output signal from one of the first and the second strain gauges into an equivalent torque value, wherein the wrench head is rotatable with respect to the tensor beam, between a first position in which the processor processes an output signal from the first strain gauge and a second position in which the processor processes an output signal from the second strain gauge.

18. The torque wrench of claim 17, wherein when the torque wrench is in the first position, the torque wrench operates over a first predetermined torque range, and when the torque wrench is in the second position, the torque wrench operates over a second predetermined torque range.

19. The torque wrench of claim 18, wherein the first predetermined torque range and the second predetermined torque range overlap.

20. The torque wrench of claim 17, wherein the first flat portion is orthogonal to the second flat portion.

* * * * *